United States Patent [19]

Lewus

[11] Patent Number: 4,772,814
[45] Date of Patent: Sep. 20, 1988

[54] PARALLEL RESONANT SINGLE PHASE MOTOR

[76] Inventor: Alexander J. Lewus, 9844 N. 11th Ave., Phoenix, Ariz. 85021

[21] Appl. No.: 935,009

[22] Filed: Nov. 26, 1986

Related U.S. Application Data

[63] Continuation-in-part of Ser. No. 855,935, Apr. 25, 1986, abandoned.

[51] Int. Cl.[4] .......................... H02K 11/00; H02P 1/44
[52] U.S. Cl. .................................. 310/72; 310/68 R; 310/166; 318/785; 318/817
[58] Field of Search ................ 310/72, 166, 68 R; 318/785–790, 793, 794, 795, 816, 817; 361/29

[56] References Cited

U.S. PATENT DOCUMENTS

| | | |
|---|---|---|
| 1,882,733 | 10/1932 | Ballman . |
| 2,028,230 | 1/1936 | Lyden ................................ 318/795 |
| 2,630,540 | 3/1953 | Hewlett, Jr. ....................... 310/162 |
| 2,836,780 | 5/1958 | List, Jr. et al. ..................... 318/795 |
| 2,922,943 | 1/1960 | Rupp ................................. 318/254 |
| 3,036,255 | 5/1962 | Lewus ............................... 318/768 |
| 3,573,579 | 4/1971 | Lewus ............................... 318/787 |
| 3,916,274 | 10/1975 | Lewus ............................... 318/787 |
| 4,675,565 | 6/1987 | Lewus ............................... 310/68 R |

Primary Examiner—Patrick R. Salce
Assistant Examiner—D. L. Rebsch
Attorney, Agent, or Firm—LaValle D. Ptak

[57] ABSTRACT

An improved electric motor is operated from a single phase alternating current power source and employs a start winding and a run winding connected in series. A capacitor is connected in parallel with the start winding; and the inductance of the start winding and the capacitance of the capacitor are selected to form an LC resonant circuit at the operating frequency, thereby displacing the phase of the alternating current in the motor winding by 90°.

20 Claims, 3 Drawing Sheets

PARALLEL RESONANT SINGLE PHASE MOTOR

RELATED APPLICATION

This application is a Continuation-In-Part of application Ser. No. 06/855,935, filed Apr. 25, 1986, now abandoned.

BACKGROUND

Alternating current motors are widely used for a wide variety of different purposes. Such motors range in size from very small fractional horsepower motors on up to multiple horsepower sizes. Most large horsepower electric motors are three phase motors, while the majority of smaller fractional horsepower and low horsepower motors are operated from a source of single phase alternating current electricity. Single phase motors are particularly popular since most home and business alternating current supplies are in the form of single phase supplies.

Electric motors typically include a stator, which is wound with start windings and run windings connected to the source of operating power. The stator windings surround a rotor which rotates a shaft to produce the motor output. Rotors are made in a number of different configurations, such as squirrel cage rotors, high resistance rotors, low resistance rotors, wound rotors or multiple winding high and low resistance rotors. All of these configurations, along with various stator win ings arrangements, are well known in the electric motor industry.

Conventional single phase motors frequently are constructed in a "capacitor-start" or "capacitor-start-/capacitor-run" configuration. In capacitor-start motors, the start winding is connected in series with a starting capacitor and a centrifugal or thermal switch across the input terminals. The run winding is connected in parallel with this series-connected starting circuit. In such capacitor start motors, the starting condition is such that the instantaneous locked rotor current is high and the motor starting current demand factor also is high. Such motors undergo relatively high operating temperatures and require some type of mechanical switch (such as a centrifugal or thermal switch) for disconnecting or opening the starting winding circuit after a preestablished rotational speed of the rotor is reached. The starting winding in such capacitor start motors typically is wound with relatively fine or small diameter wire compared to the wire used in the run winding. Because small gauge fine wire is used in the starting winding, such motors have a relatively limited life due to burn-out of the start winding.

In addition, the requirement for the cut-out switch in series with the start winding and start capacitor results in additional complexity, cost, and potential for failure of such motors. For example, if a centrifugal switch is employed, the switch contacts necessarily must be built into the circuit, as well as the interconnections of the mechanical centrifugal switch parts with the shaft of the rotor. Such parts are subject to failure and in fact do fail.

It is desirable to provide an electric motor operated from single phase operating current power which employs start windings and run windings electrically displaced in the stator by 90° without requiring cut-out switches, centrifugal switch, relays or other devices to disconnect the starting winding upon the motor reaching its running condition of operation.

SUMMARY OF THE INVENTION

Accordingly, it is an object of this invention to provide an improved alternating current motor.

It is another object of this invention to provide an improved alternating current motor operated from single phase alternating current power.

It is an additional object of this invention to provide an improved single phase alternating current motor capable of developing moderate starting torque, operating at high efficiency, low starting current, and low running current.

It is a further object of this invention to provide an improved electric motor operating from single phase alternating current power which does not require switches in the start winding circuit.

It is yet another object of this invention to provide a parallel resonant LC circuit, utilizing a capacitor across the start winding of a single phase alternating current motor, to produce electrical phase displacement between the start winding and run winding of such motor.

It is still another object of this invention to produce a single phase electric motor which is capable of using the same wire size for the start winding and run winding.

It is still an additional object of this invention to provide a single phase motor comprising two series-connected windings displaced electrically out of phase in the stator core by 90° a capacitor connected in parallel with one of the windings, whereupon the one winding and the capacitor have values selected to develop inductance and capacitance near or at parallel resonance at the operating frequency of the motor.

In accordance with a preferred embodiment of this invention, an alternating current motor operated from a source of single phase alternating current power includes a start winding connected in parallel with a capacitor to form a variable motor inductance-capacitance LC resonant circuit at the frequency of the power supplied by a source. This parallel connection of the start winding and capacitor then is connected in series with a run winding which controls resultant motor current across the power supply terminals. The result is that the current through the two windings is substantially near or at 90° phase displacement during both starting and running conditions of the motor.

DETAILED DESCRIPTION

Reference now should be made to the drawings, where the same reference numbers are used in the different figures to designate the same or similar components.

Figure 1:
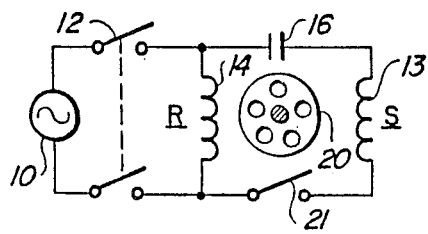
FIG. 1 is a schematic diagram of a prior art capacitor-start motor.
Figure 2:
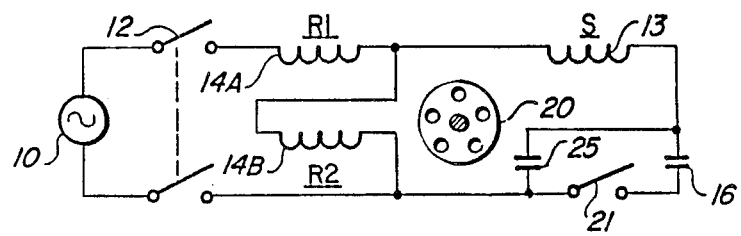
FIG. 2 is a schematic diagram of a prior art capacitor-start/capacitor-run single phase electric motor.

FIGS. 1 and 2 are schematic representations of conventional prior art single phase capacitor-start and capacitor-start/capacitor-run electric motors. The motor of FIG. 1 is made to be connected with a suitable source of single phase alternating current power 10 (typically 60 Hz, 110 volt power) through a double-pole single-throw switch 12. The motor comprises a start winding 13 and a run winding 14 wound on a suitable stator frame to effect the rotation of a rotor 20 in a conventional manner. The start winding 13 is connected in series with a start capacitor 16 and a switch 21 across the terminals of the switch 12. The run winding 14 is connected across the switch 12 also, causing it to be in parallel with the series-connected circuit of the start winding 13, capacitor 16, and switch 21. Typically, the switch 21 is a centrifugally operated switch, or the like; so that when the motor is in its stopped or non-running condition the switch 21 is closed. When the contacts 12 are closed to apply power from the source 10 to the motor, power initially flows through the capacitor 16 and the start winding 13 through the switch 21 to apply an out of phase starting current to the rotor 20 with respect to the run winding 14. The start winding 13 is made of relatively fine or small diameter wire compared to the wire used for the run winding 14. A relatively high starting voltage drop occurs across the winding 13, and relatively high capacitor current flows through the series-connected capacitor 16 and winding 13 during the start-up time. A fairly rapid temperature rise also takes place through the winding 13; so that if, for some reason, the rotor 20 does not attain operating speed quickly, damage to the starting winding 13 may occur. In extreme cases the motor may burn out. Under normal conditions of operation, however, the rotor 20 relatively quickly comes up to speed, causing the centrifugal switch 21 to open. When this occurs, all of the current for maintaining the running of the motor passes through the run winding 14, since the start winding 13 and the capacitor 16 are switched out of the circuit when the switch 21 opens.

A variation of the prior art motor of FIG. 1 is shown in FIG. 2. In the motor of FIG. 2, a pair of series-connected run windings 14A and 14B are connected across the terminals of the switch 12. In addition, a run capacitor 25 (having a lower capacitance than capacitor 16) is connected in shunt or parallel across the switch 21 and capacitor 16. The start-up conditions for the motor of FIG. 2 are the same as for FIG. 1. Upon attainment of desired operating speed, however, when the switch 21 opens, current still flows through the series-connected start winding 13 and capacitor 25 during normal operating conditions of the motor. This current is out of phase with that flowing through the run windings 14A and 14B.

The operation of the motor of FIG. 2 is well known and need not be discussed further here. It should be noted, however, that the disadvantages of the starting conditons which exist with respect to the capacitor-start motor of FIG. 1 still are present with the motor of FIG. 2. The start winding 13 is typically wound with wire which is of smaller diameter than used in the run windings 14A and 14B. The disadvantages of the prior art motor of FIG. 1 with respect to operating voltage, high temperature, and high current also are present with the prior art capacitor-start/capacitor-run motor shown in FIG. 2.

Figure 3:
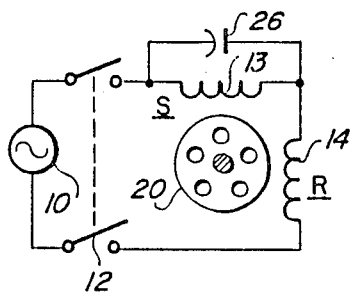
FIG. 3 is a schematic diagam of a preferred embodiment of the invention.

FIG. 3 is a schematic diagram of a preferred embodiment two-phase capacitor motor adapted to be operated from a single phase alternating current source which has the advantages of a capacitor start motor, but without the necessity of the additional mechanically operated switch 21 and without the disadvantages of high voltage, high current, and high resistance which are present in the prior art motors of the type showing in FIG. 1 and FIG. 2. In place of connecting the start capacitor in series with the start winding, the start winding 13 is connected in parallel with a capacitor 26. This forms a parallel resonant circuit, the resonance of which is selected to be at or near the 60 Hz frequency of the power supply 10. Obviously, if power supplies of different frequencies, such as 50 Hz or 120 Hz are used, the resonance of the LC parallel resonant circuit, consisting of the winding 13 and capacitor 26, is selected to match the frequency of the source 10. The capacitor 26 is an alternating current non-polarized capacitor, and may be an electrolytic capacitor.

The start winding 13 and the run winding 14 of the motor shown in FIG. 3 are wound on the stator core (not shown) and are electrically displaced in phase by 90°. The run winding 14 is connected in series circuit with the parallel resonant circuit, consisting of the start winding 13 and the capacitor 26, directly across the terminals of the switch 12. The start winding 13 is dephased from the run winding 14 by 90° electrical phase displacement as a result of the capacitor 26. This causes the current through the winding 13 to be a lagging current while the current through the second phase winding 14 is controlled at or near unity power factor at the voltage across the winding 14, The parallel resonant circut, including the start winding 13, also permits the wire used in the start winding 13 to be of the same relatively large gauge or diameter as the wire used in the run winding 14. Consequently the risk of burning out or overheating the start winding 13 which is present in prior art capacitor start motors, is not present with the motor shown in FIG. 3.

It also should be noted that the configuration illustrated in FIG. 3 may be used with motors having rotors in various configurations. For example, the rotor 20 may be a squirrel cage rotor, a high resistance rotor, a low resistance rotor, a wound rotor, or a multiple two-winding high and low resistance rotor. The parallel resonant start winding in series with the run winding configuration for the stator which is shown in FIG. 3 is capable of use with motors of a number of otherwise standard constructions.

The motor in FIG. 3 typically is used in applications which do not require a very high starting torque, such as pumps, blowers, machine tools and many commercial and domestic applicances. The motor of FIG. 3 consumes less electrical energy, has a lower starting current, and a lower motor running current than the motors of the prior art shown in FIGS. 1 and 2. As the capacitance of the capacitor 26 is increased, the power and starting and running torque of the motor is increased, until the flux density 13 and 14 of the stator core and windings nears saturation. In addition, the motor of FIG. 3 operates at very high efficiency near unity power factor (or substantially at unity power factor). The motor also may be adapted for different motor speeds such as two-pole 3450 rpm, four-pole 1750 rpm, six-pole 1100 rpm, et cetera.

Figure 4A:
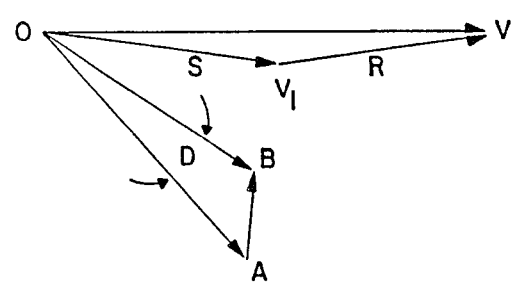
FIGS. 4A through 4C are vector diagrams of operating conditions of the motor shown in FIG. 3.
Figure 4B:
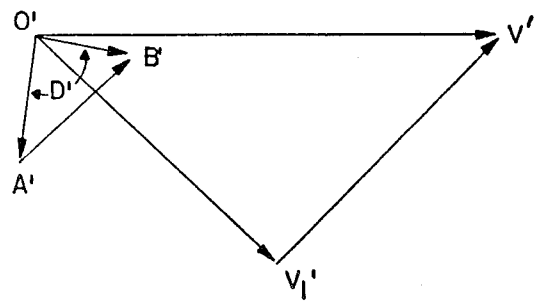
Figure 4C:
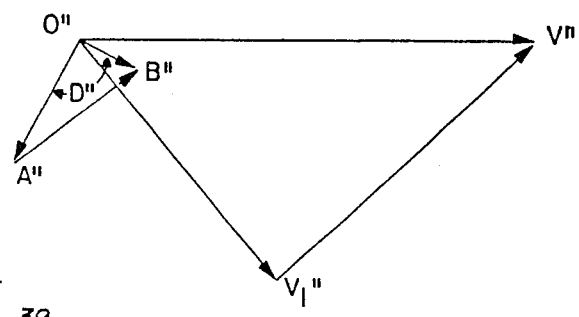

FIGS. 4A through 4C illustrate respectively the vector diagrams for the motor of FIG. 3 at start, full load, and no load conditions of operation. In FIG. 4A, the motor starting condition, the vector voltage from 0 to V is a single phase line reference voltage. The voltage from 0 to $V_1$ is the first phase voltage, (the voltage across winding 13), and the second phase voltage (that across the winding 14)is from vector V1 to V. The capacitor current through the capacitor 26 leads the voltage V by approximately 90°. This is apparent from an examination of the lower portion of the vector diagram of FIG. 4A. The current through the first phase (the start winding 13) is illustrated from 0 to A. The capacitor current vector is from A to B (leading the voltage vector, 0 to V, by approximately 90°). Consequently, the resultant current vector is from O to B, which is the current through the run winding 14 or second phase, constituting the vector sum total current drawn from the single phase power source at the motor starting conditions. As is apparent from a subsequent comparison of FIG. 4A with FIGS. 4B and 4C, this starting current is higher than the full load and no load current, but still is a relatively low current in comparison with prior art motors of the type shown in FIGS. 1 and 2.

It may be seen in FIG. 4A that the current vectors of 0 to A and A to B, develop the resultant current vector B to 0. The phase displacement of this vector (Angle D) is the dephased amperes of the motor at the instant starting condition. The Angle D may be in the vicinity of 5° to 90° for dephasing the current at motor starting condition.

FIG. 4B illustrates the vectors (voltage and current) for the motor of FIG. 3 operating at full load condition. The vector from 0' to V' is the voltage reference vector single phase power available from the source 10. The voltage vector from 0' to $V_1$' is the first phase voltage of the start winding 13, and the second phase voltage of the run winding 14 is from $V_1$' to V'.

The current vector under full load conditions of operation (FIG. 4B) are shown in the resultant vector from 0' to B', This is the resultant of the vector sum current of the first phase vector 0' to A' and the capacitor current vector A' to B', The Angle D' is the current phase displacement of the motor full load running condition. This angle, at full load operating conditions, is approximately 90°.

FIG. 4C shows the voltage and current vectors of the motor of FIG. 3 operating at no load. Under this condition of operation, parallel resonance of the winding 13 and capacitor 26 takes place, where the capacitor current and the winding current through the winding 13 is relatively high, while the current through the winding 14, the run winding, is comparatively low. The voltage vectors 0" to $V_1$" through the winding 13, and the voltage vector $V_1$" to V" of the second phase through the run winding 14, create the resultant vector 0" to V". A considerable difference in the current vector from the full load condition shown in FIG. 4B is apparent. The current vector of the winding 13, 0" to A" and the current vector of the capacitor 26 A" to B" are approximately equal; but because of the parallel resonance of the winding 13 and the capacitor 26, the current vector 0" to B" through the second phase run winding 14 is quite short.

An actual motor, modified to have the winding configuration illustrated in FIG. 3 and from which the information providing the basis for the vector diagrams of FIGS. 4A through 4C, was constructed. The motor was a standard General Electric motor, Frame 182, Model No. 5KS182AC287. This was a one horsepower motor, 1715 rpm, 208 volts, 7.2 amperes. The stator was rebound in accordance with the configuration of FIG. 3 with a #16 wire for both windings 13 and 14, and a parallel resonant circuit was produced by adding the capacitor 26; so that the electrical configuration of the stator was in accordance with the embodiment of FIG. 3. The table reproduced below indicates measurements which were taken at start, full load, and no load conditions of operation (allowing approximately 2% to 5% ± meter accuracy readings).

TABLE I

|  | Single Phase Power Input | First Phase (Winding 13) | Second Phase (Winding 14) | Capacitor (26) 200 MFD |
|---|---|---|---|---|
| Start Peak A* | 18 A | 22 A | 18 A | 7.5 A |
| Run A | 5 A | 8.3 A | 5 A | 10 A |
| No Load A | 2.5 A | 10 A | 2.5 A | 12 A |
| Start V* | 230 V | 80 V | 150 V | 80 V |
| Run V | 240 V | 150 V | 220 V | 150 V |
| No Load Volts | 240 V | 160 V | 220 V | 160 V |
| PF* Start | 85% | 80% | 80% | 0 |
| PF Run | 97.5% | 10% | 95% | 0 |
| PF No Load | 80% | 10% | 100% | 0 |

Key:
A* - Amperes
V* - Volts
PF* - Power Factor

From the measured currents of the motors shown in the above table, the Angle D (FIG. 4A) for the dephasing of the starting current equals approximately 19°. For the run condition the Angle D' of FIG. 4B is approximately 86°, while the Angle D" (FIG. 4C) at the no load running condition is approximately 38°. Because of the possibility of instrument readings which varied approximately 2% to 5%, these angles also vary somewhat. The relative angles, however are as shown in FIGS. 4A, B, and C, and as indicated above. At starting conditions, the above motor developed approximately 3.0 ft. lbs. of starting torque. At 1740 rpm and 5 amperes power input, the motor pulling or breakdown torque reached 8.75 ft.lbs. As noted from the above table, the motor operating at full load and at 1740 rpm produced a torque of 3 ft.lbs. on 5 amperes of current for the full one horsepower motor output. The motor as originally designed draws 7.2 amperes for its full one horsepower output, so that the modified winding configuration of FIG. 3 results in significantly higher efficiency.

Figure 5:
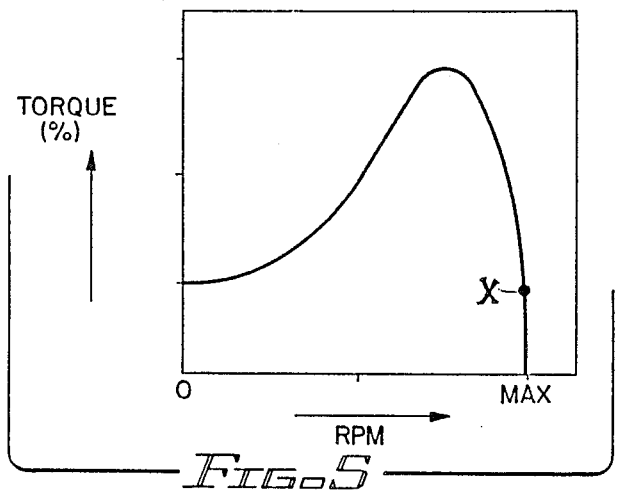
FIG. 5 is a curve illustrating the relative starting and running torques of the motor of FIG. 3.

FIG. 5 is an output curve of the increasing rpm from zero to maximum (1740 rpm) versus torque of the motor shown in FIG. 3 and having the characteristic illustrated in the above table. The "X" on FIG. 5 indicates the relative torque at full load operating conditions. The maximum rpm is shown for the no load condition.

Figure 6:
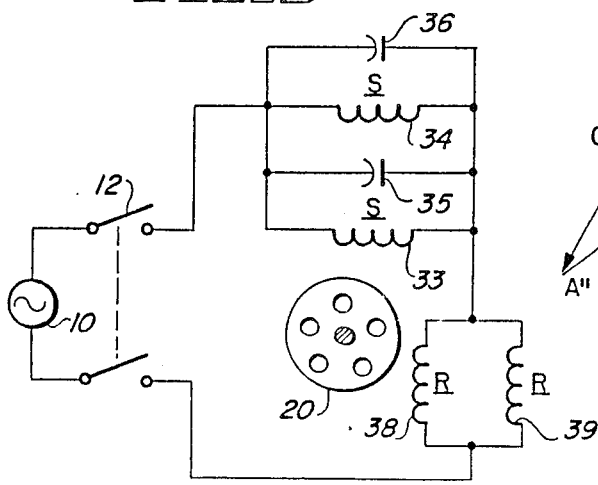
FIGS. 6 through 11 illustrate other embodiments of the invention.

FIGS. 6 through 10 illustrate variations in start and run winding configurations which employ the same principles of the embodiment shown in FIG. 3. For example, FIG. 6 illustrates the use of parallel start windings 33 and 34, having corresponding parallel capacitors 35 and 36 connected across them. The parallel winding-/capacitor configuration then is connected in series with a pair of parallel-connected run windings 38 and 39. The performance and operating characteristrics of the motor shown in FIG. 6 are similar to those of the motor of FIG. 3, but the motor of FIG. 6 is capable of operating at lower voltage than the motor of FIG. 3.

Figures 7, 10:
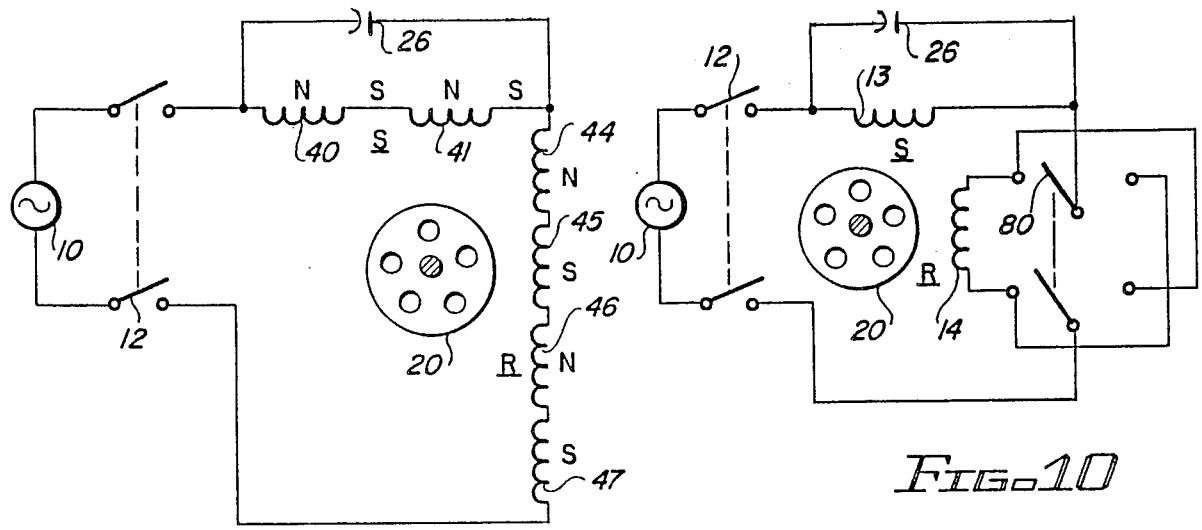

FIG. 7 illustrates another variation of stator windings in which the stator core is wound in what is termed a "consequent pole" arrangement. In this arrangement, the first phase or start winding constitutes a pair of series-connected windings 40 and 41 wound to develop the north pole connections internally in the stator all facing the same direction. The capacitor 26 is connected across the series-connected windings 40 and 41 and produces the desired parallel resonance at motor no load running conditions. Similarly, the run winding is made up of four series-connected windings 44, 45, 46, and 47, which are wound to produce alternate magnetic polarities as indicated in FIG. 7. Consequent pole motors are known; and the invention, illustrated in its basic form in FIG. 3, may be applied to these motors as well as to the basic motor of FIG. 3. The wire sizes or wire gauge of the motor winding 40, 41, 44, 45, 46, and 47 are the same; and the return ratios may be equal or unequal with respect to the start windings 40, 41, and the run windings 44, 45, 46, and 47.

Figure 8:
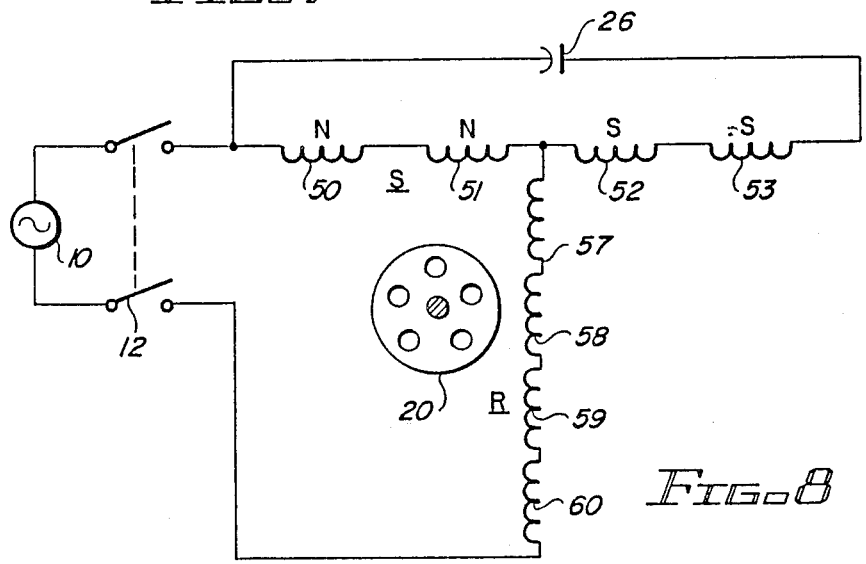

FIG. 8 illustrates another arrangement with which the invention may be used. The first or start winding comprises of four series-connected windings 50, 51, 52, and 53, with the connection between the windings 51 and 52 comprising a center tap to which four series-connected run windings 57, 58, 59, and 60 are connected. The capacitor 26 forms a parallel resonant circuit across all four of the start windings 50 through 53. The primary object of the circuit arrangement of FIG. 8 is to increase the capacitor voltage and to use a smaller capacitance for the capacitor 26. The motor also produces a higher voltage and increased starting torque, increased pull-in torque, and increased motor full-load operating torque. The version of FIG. 8 is used for applications where a higher starting torque is required and where the starting torque of the motor configuration of FIG. 3 would be insufficient.

Figure 9:
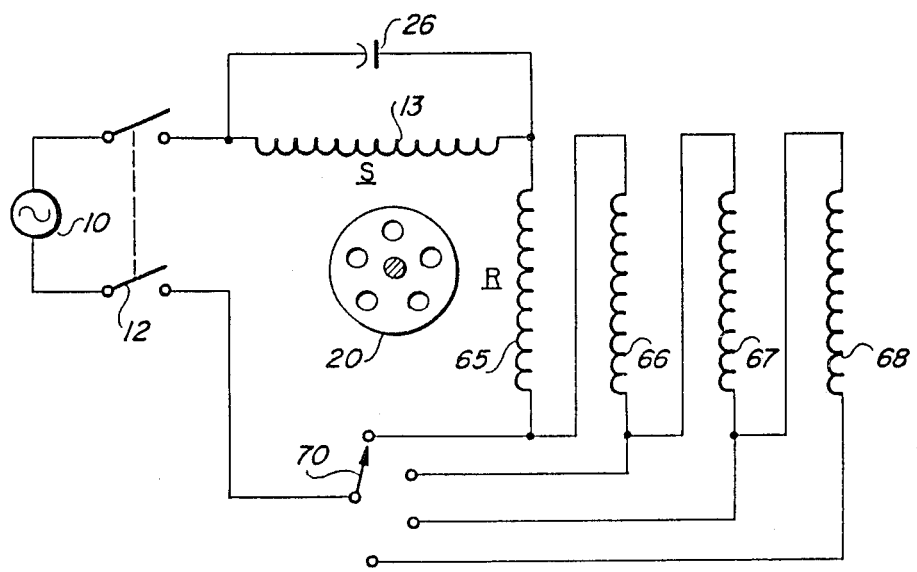

FIG. 9 illustrates a multiple speed motor in which the run winding comprises four series-connected windings 65 through 68, the junctures between each of which are connected to one terminal of a rotary switch 70, the other terminal of which is connected to the lower terminal of the switch 12. The moving contact of the switch 70 then may be connected to any one of the four windings to connect any number of them (from one to four) in series with one another and with the power supply supplied through the switch 12. The start winding 13 and the parallel-connected capacitor 26 are the same for the motor shown in FIG. 9 as for the motor described previously in conjunction with FIG. 3. By making the connection through the switch 70 at any one of the four different positions, the motor may be operated at any one of four different speeds. The windings 65, 66, 67, and 68 typically are wound with different size of gauges of wire, each with the same polarity. A motor of the type shown in FIG. 9 typically is used for a fan air conditioning motor, such as a 115 volt six-pole 1100 rpm motor which, by changing the position of the switch 70, increases impedance to cause it to operate as low as 600 rpm.

FIG. 10 is a variation of the motor shown in FIG. 3 which illustrated the manner in which the motor can be operated to instantly reverse direction of rotation of the rotor 20. To accomplish this, a double-pole, double-throw switch 80 is used to interconnect the lower terminal of the switch 12 and the junction of the parallel-connected start winding 13 and capacitor 26 with the ends of the run winding 14. In one switch position, the connections are the same as shown in FIG. 3. In the opposite switch position (to the right in FIG. 10) that the currentflow through the winding 14 is reversed 180° from that of FIG. 3; and the rotor 20 rotates in the opposite direction. Since there is no centrifugal switch or other mechanical apparatus used in the motor of FIG. 10, instant reversal or quick reversal of the direction of the rotor 20 may be effected. The switch 80 may be thrown from one position to the other, even while the motor is energized and operating at its maximum rpm. The motor will instantly reverse direction under either no load or full load conditions. This is to be contrasted with a conventional capacitor start motor in which the centrifugal switch (such as the switch 21 of FIG. 1) is employed. In such conventional motors, the motor must be brought to a full stop before reversing the direction of its operation. That is not necessary with the motor shown in FIG. 10.

Figure 11:
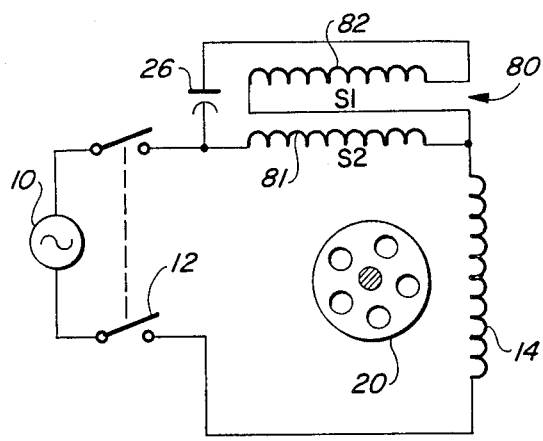

FIG. 11 illustrates another embodiment which permits a reduction in the size of the capacitor 26 from the embodiments. In FIG. 11, the start winding is split into two parts to form the primary winding 81 and the secondary winding 82, respectively, of a transformer 80. The capacitor 26 forms a parallel resonant circuit across both the primary and secondary windings 81 and 82. So far as the capacitor 26 is concerned, the windings 81 and 82 are connected in series. They are wound, however, with two wires or two separate insulated coils coinciding with one another in the stator core in the same slots. A center tap between the windings 81 and 82 is connected to one end of the run winding 14, the other end of which is connected to the opposite pole of the switch 12 in a manner similar to the connections of the windings of the embodiment of FIG. 8.

In the operation of the circuit shown in FIG. 11, a maximum Counter-Electro Magnetic Force (CEMF) is generated in the transformer windings 81 and 82 as an additive or cumulative voltage. As a consequence the voltage across the capacitor 26 is a higher voltage than for the embodiments described above in conjunction with FIGS. 3, 6, and 7 through 10. The voltage across the capacitor appears to be 180° out of phase with the voltage across the windings 81 and 82 of the transformer 80. Since a higher voltage appears across the capacitor 26, lower cost, standard, high voltage capacitors may be used for the capacitor 26.

It is desirable to have an equal number of stator slots for distribution of the two windings 81 and 82, so that the voltages are balanced. The motor stator slots in many motors, however, are unbalanced in a ratio which causes the distribution also to be unbalanced. As a consequence, with such motors, unbalanced voltages occur in the windings 81 and 82. Even so, the advantages of the transformer-coupled embodiment of FIG. 11, permitting the use of standard high-voltage capacitors for the capacitor 26 still are realized.

A motor having the configuration shown in FIG. 11 employs a reduced size of capacitor for the capacitor 26 and is smaller in size than a standard motor producing the same amount of power. The configuration of FIG. 11 produces increased efficiency, and the motor develops moderate starting torque at low starting and running current. Such a motor develops what may be termed a "soft" motor starting torque. As a consequence, a motor configured in accordance with the embodiment shown in FIG. 11 is ideal for applications where the source of power is a portable alternator or portable alternating current generator where a limited amount of motor starting current is desirable. Motors can be operated from a small output AC generator if the slow starting and running current is required. Conventional capacitor start motors cannot be used with such small portable generators because such conventional motors require high motor starting current.

Figure 12:
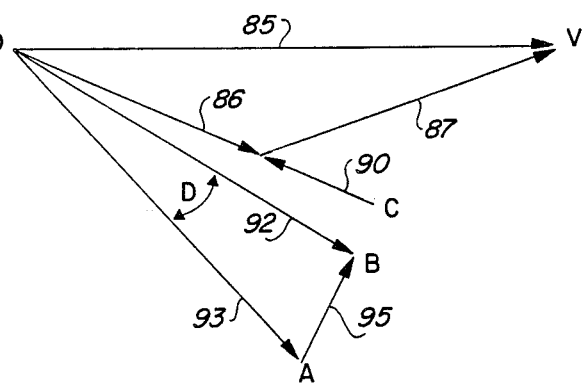
FIG. 12 through 14 are vector diagrams of operating conditions of the motor of FIG. 11.
Figure 13:
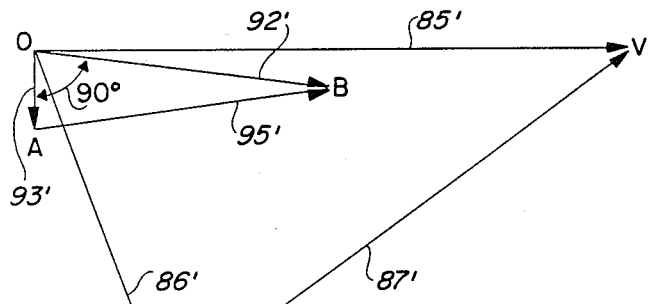
Figure 14:
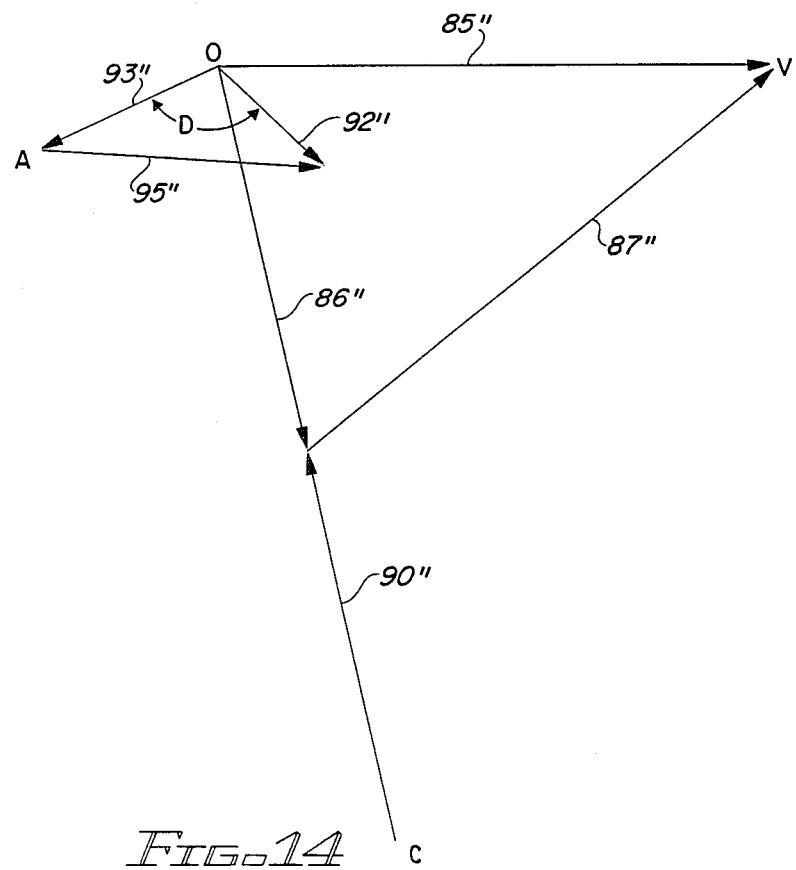

Reference now should be made to FIGS. 12 through 14 which illustrate, respectively, the vector diagrams for the motor of FIG. 11 at start, full load, and no load conditions of operation. In FIG. 12, the motor starting condition, the vector voltage from 0 to V, line 85, is the line voltage. Vector 86 and 90 represent respectively the voltage vectors for the primary winding 81 and the secondary winding 82. The vector 87 is the voltage across the run winding 14. The voltage across the secondary winding 82, and therefore across the capacitor 26, is 180° out of phase with the voltage across the primary winding 81 as indicated by the voltage vector 86 for the winding 81.

The current through the winding 1 is shown by the vector 93. The capacitor current vector is illustrated in FIG. 12 by the vector 95; and the resultant current vector 92 is the current through the run winding 14, constituting the vector sum total current drawn from the single phase power source at the motor starting conditions. As is apparent from a comparison of the starting conditions shown in FIG. 12 with the run and the no load conditions illustrated in FIGS. 13 and 14, the starting current shown by the vector 92 is higher than the full load and no load currents illustrated by the vectors 92' and 92", but still is a relatively low current in comparison with prior art motors of the type shown in FIGS. 1 and 2.

The vectors shown in FIG. 13 for the full load condition are provided with the same numbers primed (') and the vectors for the motor of FIG. 11 operated at no load conditions are indicated by double primed (") indications for comparison of the various vectors of FIGS. 12, 13, and 14.

An actual motor, modified to have the winding configuration illustrated in FIG. 11 and from which the information providing the basis for the vector diagrams of FIGS. 12, 13, and 14 was obtained, has been constructed. The motor was a standard Leland Faraday motor, Frame 145T, Serial No. 38J50-7110. The motor specification were 1.5 horsepower, 1725 rpm, 115/230 volts, 9.5 amperes as manufactured. The stator was rewound in accordance with the configuration of FIG. 11 to cause the primary winding 81 and the secondary winding 82 to be placed in the same stator core slots. The wire size was selected to provide a sufficient safety factor for the current drawn through each winding as indicated in TABLE II below. In addition to the modification to form the transformer 80, a capacitor 26 was added and interconnected as illustrated in FIG. 11. TABLE II indicates the actual measurements which were taken at start, full load, and no load conditions of operations (FIGS. 12, 13, and 14 respectively), allowing approximately 2% to 5%, ± meter accuracy readings:

TABLE II

|  | Single Phase Power Input | Winding 81 | Winding 82 | Capacitor 26 | Winding 14 |
|---|---|---|---|---|---|
| Start Peak A* | 17 A | 18 A | 5.5 A | 5.5 A | 17 A |
| Run A | 7.5 A | 3 A | 8 A | 8 A | 7.5 A |
| No Load A | 4.6 A | 5.8 A | 9.5 A | 9.5 A | 4.6 A |
| Start V* | 240 V | 110 V | 45 V | 155 V | 145 V |
| Run V | 240 V | 145 V | 145 V | 290 V | 240 V |
| No Load Volts | 240 V | 160 V | 160 V | 320 V | 250 V |

TABLE II-continued

|  | Single Phase Power Input | Winding 81 | Winding 82 | Capacitor 26 | Winding 14 |
|---|---|---|---|---|---|
| PF* Start | 88% | 90% | 1% | 1% | 75% |
| PF Run | 98% | 82% | 1% | 1% | 98% |
| PF No Load | 76% | 20% | 1% | 1% | 90% |

Key:
A* - Amperes
V* - Volts
PF* - Power Factor

This motor, with the operating characteristics shown above in TABLE II, developed a starting torque of 3.0 ft.lbs., a full load torque of 4.5 ft.lbs., and a breakdown torque of approximately 8.0 ft.lbs. or slightly greater. As is apparent from TABLE II the motor starting and running current was low. The running current of 7.5 amperes at full load, 1740 rpm, is significantly lower than the 9.5 amperes for the same motor wound in a conventional manner. Consequently, the modified winding configuration of FIG. 11 results in significantly higher efficiency for this motor.

The foregoing description has been directed to various specific embodiments of the invention. Various changes and modifications mat be made to those embodiments by those skilled in the art without departing from the true scope of the invention. For example, only a limited number of winding configurations have been illustrated. The underlying principle of the invention, namely using a parallel resonant LC circuit comprised of the start winding and a capacitor, with such resonant circuit connected in series with the run winding maybe employed in a variety of stator winding configurations.

I claim:

1. An alternating current motor having a stator core for operation from a source of single phase alternating current power, including in combination:
   a rotor for said motor;
   a start winding for said motor;
   a run winding for said motor, said run winding connected in series with said start winding on the stator core for inducing rotation of said rotor;
   means for applying single phase alternating current power to said series-connected start and run windings throughout the starting and running operation of said motor;
   capacitor means connected in parallel with said start winding to form an LC resonant circuit therewith at the frequency of alternating current power applied by said means for applying power to said windings.

2. The combination according to claim 1 wherein said start winding comprises a plurality of start windings and wherein said capacitor means is connected in parallel with said plurality of start windings.

3. The combination according to claim 2 wherein said plurality of start windings are connected to series circuit with one another.

4. The combination according to claim 2 wherein said plurality of start windings are connected in parallel with one another, and said capacitor means is connected in parallel with said parallel-connected start windings.

5. The combination according to claim 2 wherein at least said start windings comprise series connected windings wound in a consequent pole arrangement.

6. The combination according to claim 1 wherein said run winding comprises a plurality of run windings.

7. The combination according to claim 6 wherein said plurality of run windings are connected in series with one another.

8. The combination according to claim 7 further including switch means for selectively connecting different numbers of said run windings in series circuit with said start winding.

9. The combination according to claim 1 further including switch means for selectively reversing the flow of current through said run winding with respect to said start winding for reversing the direction of operation of said motor.

10. The combination according to claim 1 wherein said start winding and said run winding are formed of wire of substantially the same gauge.

11. The combination according to claim 1 wherein said start winding has a center tap and, said run winding is connected to said center tap on said start winding.

12. An alternating current motor for operation from a source of single phase alternating current power including in combination:
 a stator core;
 a rotor;
 first and second phase windings wound on said stator core in an electrical phase displacement of 90° from each other, said first and second windings being connected in series;
 means for applying a single phase alternating current power to said series-connected first and second windings throughout the starting and running operation of said motor; and
 capacitor means connected in parallel with said first phase winding to form an LC resonant circuit therewith at the frequency of alternating current power applied by said means for applying alternating current power.

13. The combination according to claim 12 wherein said capacitor means comprises an alternating current non-polarized capacitor.

14. The combination according to claim 13 wherein said capacitor is an electrolytic capacitor.

15. The combination according to claim 12 wherein said first and second phase windings are wound with wire of substantially the same size.

16. The combination according to claim 12 wherein the parameters of said first and second phase windings, said stator core, and said capacitor means are selected to cause said stator core to be operated at a flux density near saturation.

17. An alternating current motor for operation from a source of single phase alternating current power including in combination:
 a stator core;
 a rotor;
 first and second windings comprising the primary winding and the secondary winding of a transformer wound together on said stator core, each of said first and second windings having a first end and a second end, with the second end of said first winding connected at a common terminal to the first end of said second winding;
 a third winding on said stator core in electrical phase displacement of 90° from said first winding, said third winding having first and second ends with the first end connected to said common terminal;
 means for applying a single phase alternating current power connected between and the first end of said first winding and the second end of said third winding throughout the starting and running operation of said motor; and
 capacitor means connected between the first end of said first winding and the second end of said second winding to form an LC resonant circuit with said first and second windings at the frequency of alternating current applied by said means for applying said alternating current power.

18. The combination according to claim 17 wherein said capacitor means comprises an alternating current non-polarized capacitor.

19. The combination according to claim 18 wherein said capacitor is an electrolytic capacitor.

20. The combination according to claim 17 wherein said first winding, said second winding, and said third winding are wound with wire of substantially the same size.

* * * * *